April 24, 1956 T. A. KERR 2,743,432
TRANSFORMER WATER DETECTOR
Filed Dec. 4, 1952
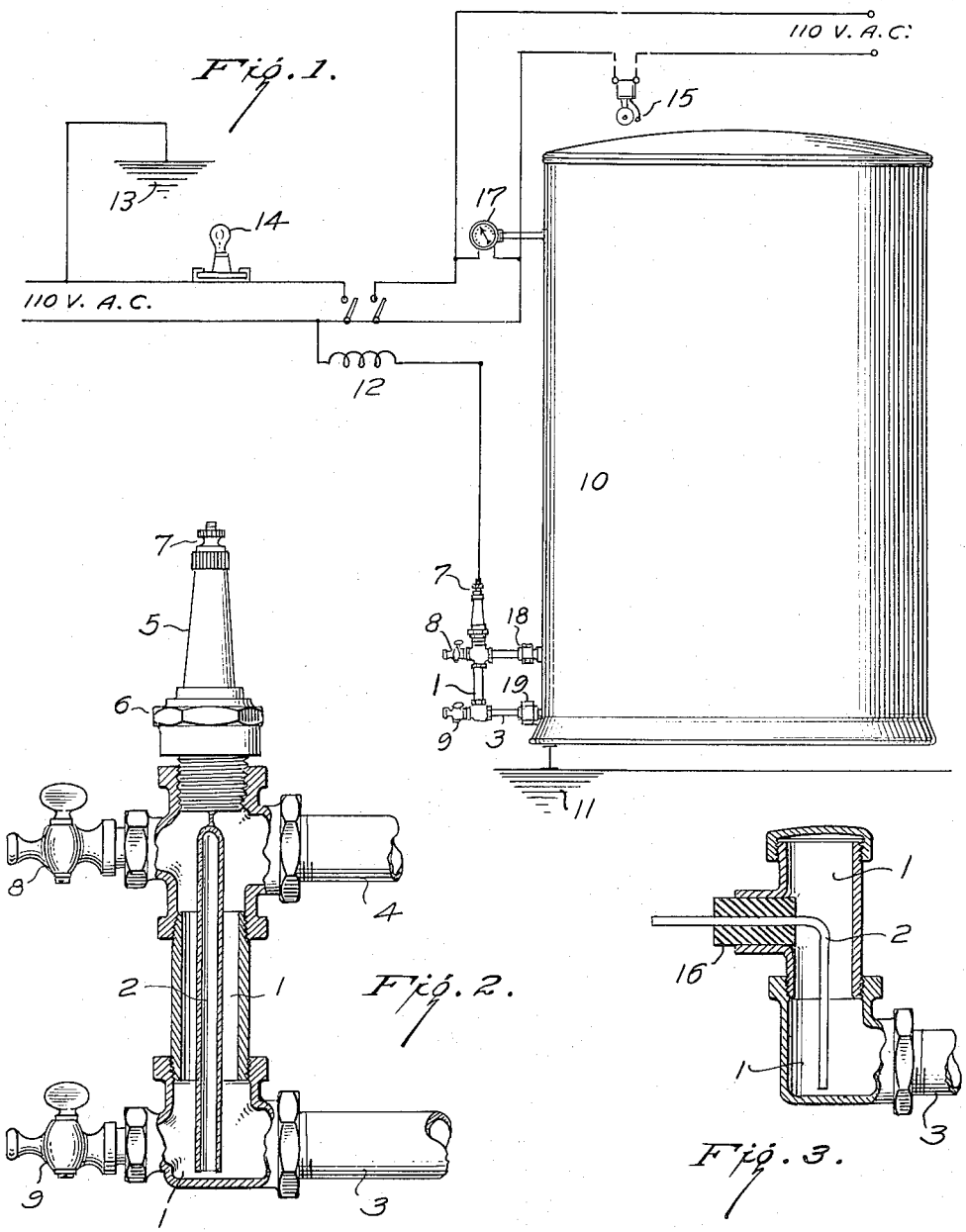
INVENTOR
*THOMAS ALEXANDER KERR,*
BY
*Theodore L. T. Thomas*
AGENT

United States Patent Office 2,743,432
Patented Apr. 24, 1956

2,743,432
TRANSFORMER WATER DETECTOR

Thomas Alexander Kerr, Welland County, Ontario, Canada, assignor to American Cyanamid Company, New York, N. Y., a corporation of Maine Application December 4, 1952, Serial No. 323,963

4 Claims. (Cl. 340—235)

This invention relates to water detectors. More particularly, this invention relates to apparatus for detecting water in oil-filled transformers.

The presence of water in the dielectric oil in an oil-filled transformer has long been a source of trouble in industry. This water can come from several sources. It may leak in through an imperfect cover on a transformer that is kept outdoors. It may leak out of the cooling oils that are often used to carry off the excess heat that builds up in the transformer oil. Or the water may be condensate that forms on the inside of an unsealed oil-filled transformer casing. Whatever the source the water can vastly diminish the dielectric breakdown strength of the transformer oil. The pyrotechnics that sometimes follow can be both costly and dangerous.

Accordingly, it is an object of this invention to supply an apparatus for detecting small quantities of undissolved water in an oil-filled transformer.

It is a further object of this invention to supply an apparatus whereby the water-caused burning out of oil-filled transformer may be eliminated.

Briefly, the apparatus of the present invention comprises a chamber adapted to connect to the bottommost portion of the interior of an oil-filled transformer. An insulated electrode passes through the chamber and extends to about ⅛ of an inch from the bottom of the chamber. This electrode is part of an electrical circuit that includes one or more alarm devices. The chamber is so connected to the interior of the transformer that any water that forms on the bottom of the transformer will run into the bottom of the chamber. No current will flow in the circuit so long as transformer oil of high dielectric strength occupies the bottom of the chamber. However, water in the bottom of the transformer will flow into the bottom of the chamber. The water in the bottom of the chamber thus serves to ground the electrode and completes the circuit of which the electrode is a part. The completion of the circuit activates the alarm devices and indicates to those responsible for the maintenance of the transformer that there is water present inside the transformer.

Referring to the drawings:

Fig. 1 is a front elevation of the apparatus of the present invention connected to a transformer;

Fig. 2 is a sectional elevation of the apparatus of the present invention; and

Fig. 3 is a sectional elevation of another modification of the apparatus of the present invention.

The invention contemplates a chamber 1 containing an electrode 2 as illustrated in Fig. 2. The bottom portion of the chamber 1 is adapted to be connected to the interior of a transformer by means of the pipe or conduit 3. The chamber 1 may be nothing more than a short section of threaded pipe. The pipe can be screwed into an elbow or T, the elbow or T thus forming the bottom of the chamber 1. Another section of pipe may be threaded into the elbow or T to make connecting pipe 3 and then threaded to a coupling that has been braised onto the bottom of the transformer casing. Another fitting such as a T may be screwed on the topmost portion of the section of pipe that serves as the chamber 1. A return line or pipe 4 may be screwed into this topmost fitting. The electrode 2 passes up through the insulation 5 of a sparkplug 6. This sparkplug may be a standard sparkplug, as for example a Champion sparkplug, type X, used for Fords. A copper tube or other suitable material may be soldered to the center sparking element of the sparkplug, thus forming the electrode 2, so that the copper tube serves to extend the center element down to within about ⅛ inch from the bottom of the chamber 1. The terminal point 7 of the sparkplug 6 is adapted to be connected into an electrical circuit. The circuit is such that no current can flow through it because of the ⅛ inch gap between the bottom of the chamber 1 and the bottom of the electrode 2. However, when water flows into the bottom of the chamber, the water short circuits the electrical circuit, thus allowing current to flow through the entire circuit. Two petcocks 8 and 9 may be mounted on the chamber each located just across from the two lines 3 and 4 that connect the device to the interior of the transformer.

The device of Fig. 2 is attached to a transformer 10 as in Fig. 1. The case of the transformer 10 is connected to an electrical ground 11. The connecting pipe 3 should be located as close to the bottom of the inside of the transformer as possible. This location insures that any water that forms inside the transformer will flow through the pipe 3 and into the bottom of the chamber 1. The water serves to short circuit the electrode 2 by electrically connecting it with the ground 11. The terminal point 7 of the sparkplug 6 is connected through an auxiliary relay 12 to one of the legs of a 110 volt A. C. source. The other leg is grounded as at 13. Alarm devices such as the indicating lamp 14 or the warning bell 15 are installed in the circuit.

The lower portion of the chamber 1 must be connected to the interior of the transformer 10 so that any water in the transformer may run into the chamber. The upper portion of the chamber need not in all cases be connected to the interior of the transformer by means of the line 4. It has been found in practice, however, that the upper connection renders the operation of the device more certain. The modification of the device wherein only the lower portion of the chamber is connected to the transformer is illustrated in Fig. 3. Here the electrode 2 enters from one side of the chamber 1. If the chamber 1 is made of metal then the insulation sleeve 16 must be made of some non-conducting material. However, if the chamber 1 is made of a non-conducting material then the insulation sleeve 16 may be of the same material.

Although it forms no part of the present invention, it is sometimes useful to incorporate in the circuit an indicating and contacting-making thermometer 17. The thermometer 17 will close the circuit independently of the device of the present invention whenever the transformer oil is heated to a dangerous predetermined point.

It is also convenient to install valves 18 and 19 in the upper and lower lines 3 and 4, respectively, in order that the device of the present invention may be removed for any necessary repairs or cleaning.

It is intended to cover all changes and modifications of the embodiments of this invention herein chosen for purposes of the disclosure which do not constitute departure from the spirit and scope of the invention.

I claim:

1. Apparatus for detecting the presence of undissolved water in an oil-filled transformer having a casing which comprises in combination with said casing: an electrically conductive chamber integrally connected to the interior of said oil-filled transformer casing by means of at least one pipe having a valve positioned in said pipe, said conductive chamber being adjacent to and located at the bottom of said oil-filled transformer casing; an electrical ground connected to said casing; an insulated electrode extending to about 1/8 inch from the bottom of said conductive chamber; a circuit consisting of a source of 110 volt alternating current and at least one alarm device, one leg of said circuit being connected to said electrode, the other leg of said circuit being connected to said electrical ground, whereby said alarm device is activated when water displaces oil in the bottom of said chamber when said transformer is at rest.

2. An apparatus according to claim 1 in which a pipe extends from a vertical wall at the bottom of said conductive chamber to a valve, whereby fluid may be discharged from said chamber.

3. Apparatus for detecting the presence of undissolved water in an oil-filled transformer having a casing which comprises in combination with said oil-filled casing: a horizontal conduit passing through a vertical wall of said casing, at the bottom thereof, and extending to a vertical exterior chamber of small horizontal cross-section and entering said chamber at the bottom of a side-wall thereof, at least the bottom of said chamber being electrically conductive, thereby positioning said chamber and providing an open passage between the bottom levels of said casing and said chamber; an electrical connection grounding said electrically conductive portion of said chamber; an elongated electrode entering an upper level in said chamber and electrically insulated therefrom, said electrode extending downwardly therethrough, the bottom of said electrode being separated from but close to the bottom of said chamber; an electrical conductor connecting said electrode to a source of electrical current, said source having sufficient voltage to cause a current to flow across the gap between the bottom of said electrode and said chamber when said gap is substantially closed by water; and an alarm device actuated by the passage of electrical current through said conductor when said transformer is at rest.

4. Apparatus according to claim 3 in which is provided a second conduit extending from the lower level in said chamber through the vertical wall thereof to a valve, whereby fluid may be discharged from said chamber.

References Cited in the file of this patent
UNITED STATES PATENTS

| | | |
|---|---|---|
| 861,003 | Wagner | July 23, 1907 |
| 1,978,392 | Von Brockdorff | Oct. 23, 1934 |
| 2,295,927 | Botteron | Sept. 15, 1942 |
| 2,411,248 | Cohen | Nov. 19, 1946 |
| 2,452,615 | Thomson | Nov. 2, 1948 |